(12) United States Patent
Girard

(10) Patent No.: US 7,594,696 B2
(45) Date of Patent: Sep. 29, 2009

(54) SINGLE-LEG SUPPORT

(76) Inventor: Jean Girard, 333, rue McMaster, Brownsburg-Chatham, Quebec (CA) J8G 3A8

( * ) Notice: Subject to any disclaimer, the term of this patent is extended or adjusted under 35 U.S.C. 154(b) by 0 days.

(21) Appl. No.: 11/822,452

(22) Filed: Jul. 6, 2007

(65) Prior Publication Data

US 2008/0007098 A1    Jan. 10, 2008

Related U.S. Application Data

(60) Provisional application No. 60/818,971, filed on Jul. 7, 2006.

(51) Int. Cl.
*B62J 1/00* (2006.01)
*A47C 1/00* (2006.01)
*A47C 13/00* (2006.01)

(52) U.S. Cl. ............. 297/195.11; 297/313; 297/344.18; 297/344.19; 297/130

(58) Field of Classification Search .............. 297/4, 297/451.4, 451.5, 215.11, 313, 440.24, 344.18, 297/195.11, 130, 344.19, 344.21; 24/340, 24/20 R; 248/541, 125.8, 411, 229.16, 229.15, 248/413; 403/377, 379.6, 109.1, 109.4, 109.6, 403/109.2, 109.5; 285/420
See application file for complete search history.

(56) References Cited

U.S. PATENT DOCUMENTS

| | | | |
|---|---|---|---|
| 401,302 A * | 4/1889 | Purdy ..................... 297/451.4 |
| 444,621 A | 1/1891 | Schneider |
| 699,932 A | 5/1902 | Smith |
| 1,462,976 A * | 7/1923 | Mesinger ................... 297/214 |
| 1,610,069 A * | 12/1926 | Weber ........................ 248/623 |
| 2,099,345 A * | 11/1937 | Olszanowski .................. 297/4 |
| 2,812,614 A * | 11/1957 | Ladyman ................. 248/188.9 |
| 3,817,483 A | 6/1974 | Garvey |
| 4,098,478 A | 7/1978 | Spitzke |
| 4,111,575 A * | 9/1978 | Hoshino ..................... 403/104 |
| 4,183,579 A * | 1/1980 | Gonzalez y. Rojas .. 297/195.11 |
| 4,676,547 A | 6/1987 | Spillman |
| 4,684,090 A | 8/1987 | Skarland |
| 4,700,914 A | 10/1987 | Cheetham |
| 4,930,839 A | 6/1990 | Saito et al. |
| 5,630,648 A | 5/1997 | Allard et al. |
| 6,033,016 A | 3/2000 | Haywood |
| 6,062,638 A | 5/2000 | Ferguson |
| 6,997,511 B2 * | 2/2006 | Marchand et al. ........... 297/314 |

* cited by examiner

*Primary Examiner*—Milton Nelson, Jr.
(74) *Attorney, Agent, or Firm*—Equinox Protection, Franz Bonsang, Patent Agent

(57) ABSTRACT

A single leg support for sitting on by a user has a seat member adjustably connected to a post member, with the post member connected to a base member which contacts a ground surface. In typical use, the support axis of the support is between about five and twenty-five degrees relative to the vertical such that the user remains in equilibrium with most of his/her weight supported by his two legs at about five degrees from the vertical with the knees slightly bent. Thus, the support carries only a small portion of the user's weight for increased comfort. The support is adapted to be fitted into a bicycle. Additionally, the support may be used with a heavy base member having a flexible joint allowing rotating movement of the support while a user is seated thereon.

24 Claims, 8 Drawing Sheets

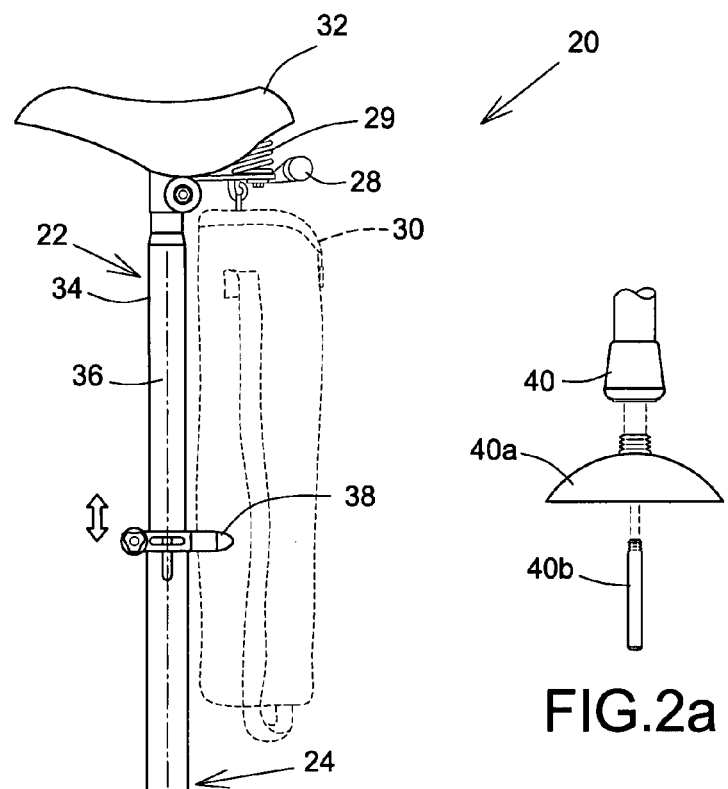
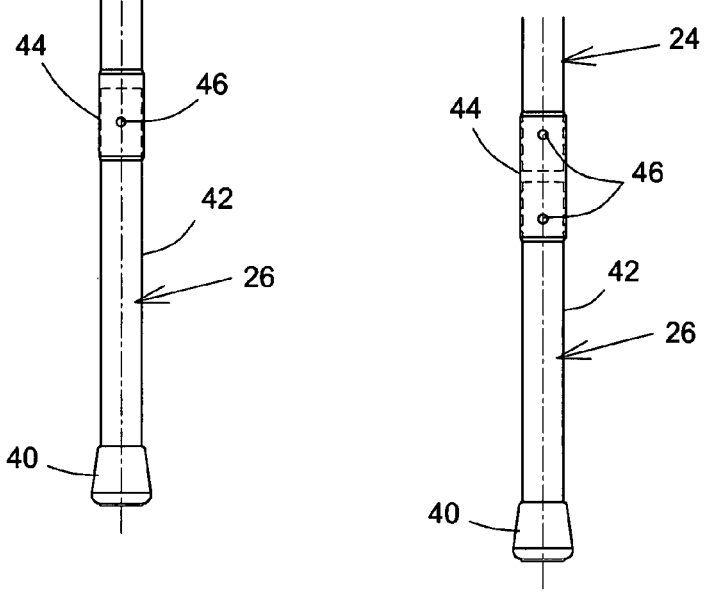
FIG.2
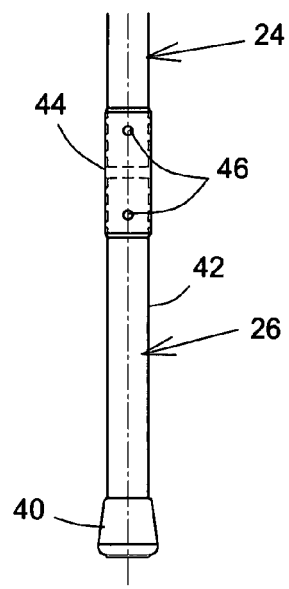
FIG.2a
FIG.2b

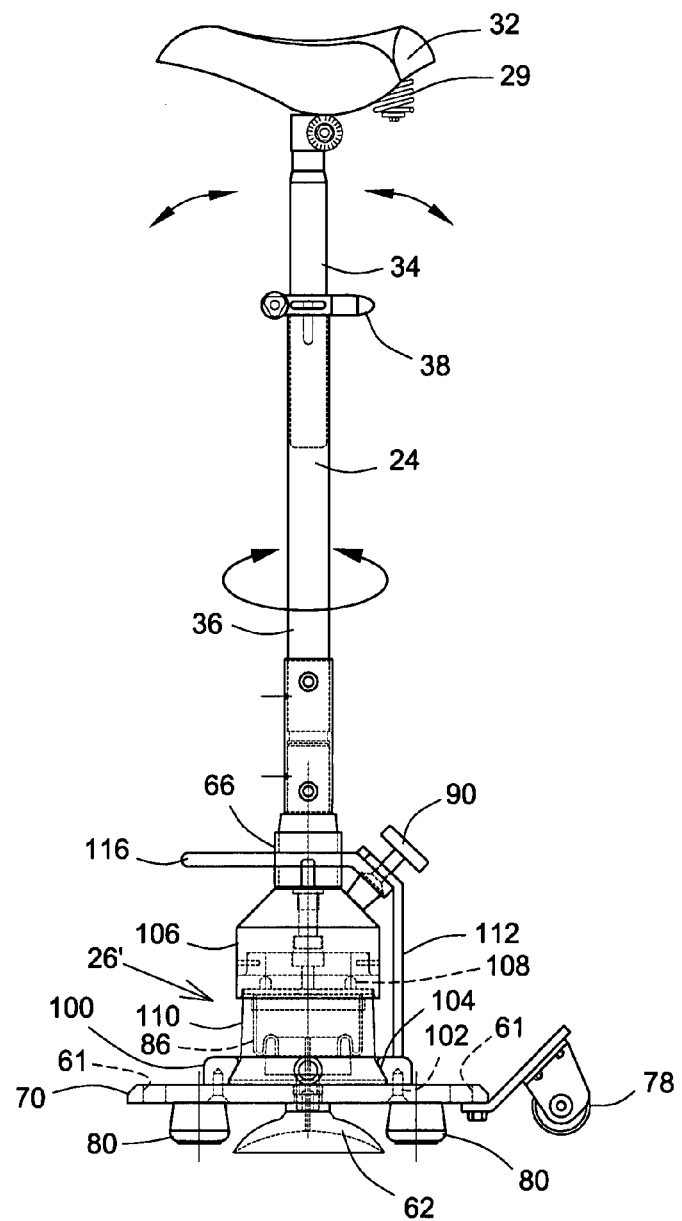
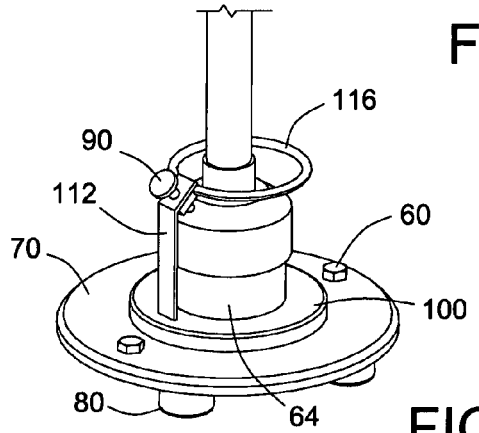
FIG.6
FIG.6a

SINGLE-LEG SUPPORT

CROSS-REFERENCE TO RELATED APPLICATION

Priority of U.S. Provisional Application for Patent Ser. No. 60/818,971, filed on Jul. 7, 2006, is hereby claimed.

FIELD OF THE INVENTION

The present invention relates to body supports, and more specifically to a single-leg support.

BACKGROUND OF THE INVENTION

It is well known in the art to have one-leg stools or seats that are usually used to support most of the weight of the user, the latter being generally vertically positioned relative to the support contacting region of the ground, such that little, or as less as possible, user's weight being supported by the user's legs. In such cases, the user, seating on a generally horizontally oriented seat, uses his/her legs only to maintain equilibrium, as illustrated and explained in U.S. Pat. No. 4,930,839 granted to Saito et al on Jun. 5, 1990.

Although some of the existing one-legged seats are adjustable in height and/or include a carrying handle, they remain relatively cumbersome to carry in day-to-day life. Furthermore, these seats prove themselves generally uncomfortable when used over long time periods exceeding a few minutes duration.

Furthermore, most of these one-legged seats are made to suit only a single type of use, i.e. with always the same bottom main section (although the base can be interchangeable, as illustrated in U.S. Pat. Nos. 4,930,839, 4,098,478 granted to Spitzke on Jul. 4, 1978, and U.S. Pat. No. 6,033,016 granted to Haywood on Mar. 7, 2000.

Another one-legged stool, such as the one disclosed in U.S. Pat. No. 4,183,579 granted to Gonzalez y. Rojas on Jan. 15, 1980 includes a spring centered hinge at its base to allow the post to tilt in any direction except rearward because of a pair of stabilizer legs which are cumbersome and include a plurality of different piece parts with hinge mechanisms there between, thus increasing the sale and maintenance costs associated therewith.

Accordingly, there is a need for an improved single-leg support.

SUMMARY OF THE INVENTION

It is therefore a general object of the present invention to provide an improved single-leg support that solves the above-mentioned problems.

An advantage of the present invention is that the single-leg support can be easily disassembled for carrying purposes and reassembled whenever required.

Another advantage of the present invention is that the single-leg support has a seat member that is releasably mountable on different base members.

A further advantage of the present invention is that the single-leg support is simple in design and is comfortable to the user for extended periods, such as, for example, when watching a show or the like in front of the stage in a stand-up position within a crowd.

Still another advantage of the present invention is that the single-leg support can be an integral and releasable part of a bicycle, including the seat; or even be used in conjunction with the seat and seat post of an existing conventional bicycle.

Yet another advantage of the present invention is that the single-leg support, when used with a heavy or even fixed base member, has a spring hinge connection, or the like, at the base interface to allow angular displacement of the seat member relative to the base member; the connection could be adjustable in rigidity and/or include a displacement constrainer of the seat member to prevent angular displacement in predetermined direction(s).

Still another advantage of the present invention is that the single-leg support has a seat post member which is axially adjustably connected to the seat member to adjust the support length and/or includes an axial suspension member for increased comfort.

According to an aspect of the present invention, therein is provided a single-leg support for supporting a user in a generally standing position on a ground surface, the single-leg support comprising:

a seat member comprising a seat post and a saddle upon which the user rests for support in the standing position;

a post member for releasably and axially adjustably receiving the seat post of the seat member;

a base member comprising a base post and a base cap connected thereto and adapted for resting of the base cap on the ground surface with the base post supporting the post member, and thereby the seat member and the user, thereabove when the user is supported on the seat member in the standing position; and an attachment mechanism comprising a resilient metal band attached to the post member and adapted for axial insertion of the base post thereinto, the resilient metal band having a first through hole for releasable engagement therein of a first locking pin on the base post for releasably attaching the base member to the post member.

Conveniently, the base member includes a base post releasably connecting to the post member and a base cap mounting on the base post for contacting engagement with the ground surface.

Optionally, the single-leg support includes the seat member that includes a saddle connecting to a seat post, the seat post releasably and axially adjustably mounting on the post member.

In one embodiment, the single-leg support is mountable on a bicycle to form a seat component thereof, and typically a portion of a bicycle frame.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 2 is a simplified side elevation view of another embodiment of the present invention;

FIG. 2a is a simplified enlarged side elevation view of another embodiment of a base member;

FIG. 2b is a simplified enlarged side elevation view of a another embodiment of an attachment member for the present invention;

FIG. 6 is a simplified side elevation view of the embodiment of FIG. 2 with another embodiment of a heavy base member; and FIG. 6a is a top perspective view of the heavy base member shown in FIGS. 5 and 6.

DETAILED DESCRIPTION OF THE PREFERRED EMBODIMENTS

With reference to the annexed drawings the preferred embodiment of the present invention will be herein described for indicative purpose and by no means as of limitation.

Figure 1:
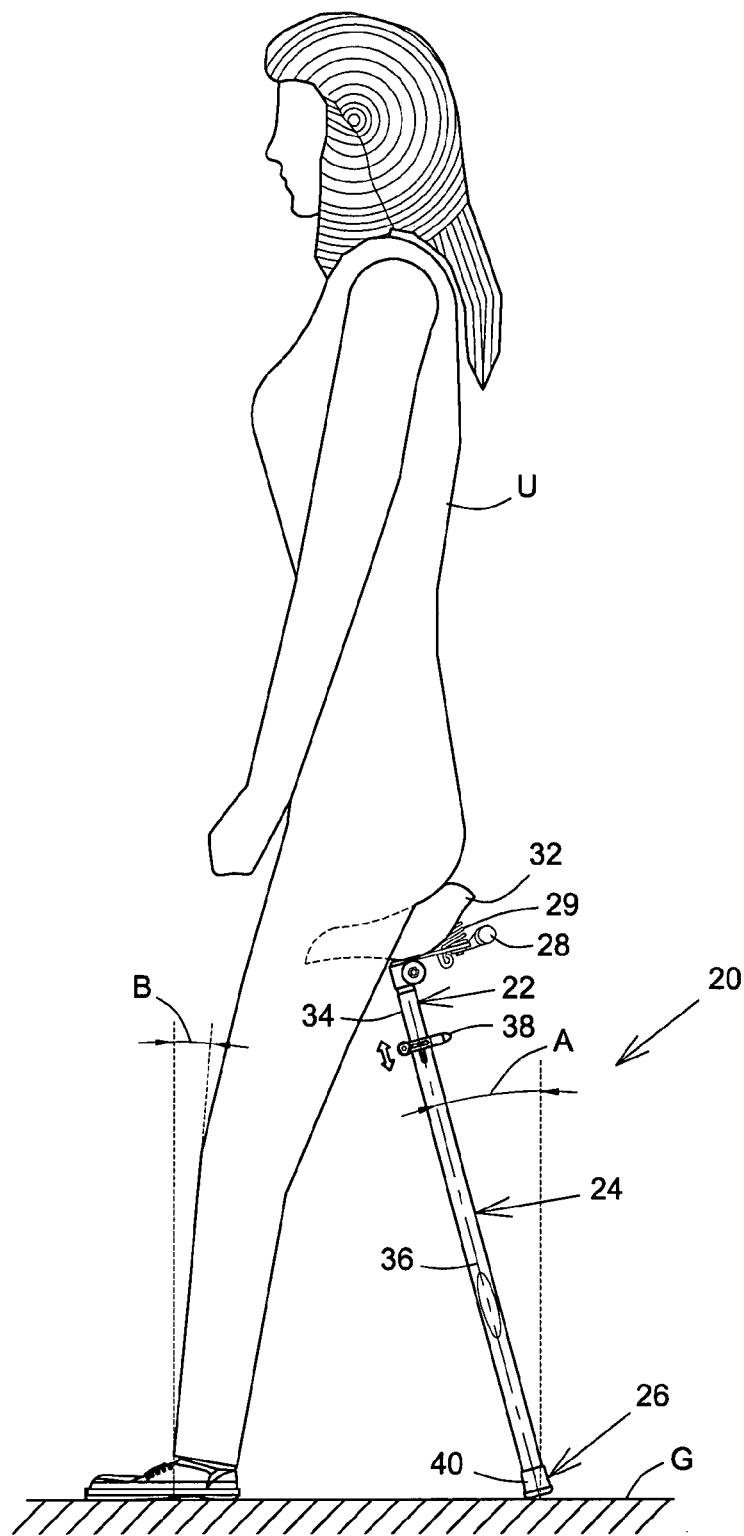
FIG. 1 is a simplified side elevation view of a single-leg support in accordance with an embodiment of the present invention, showing a user being partially supported by the support with the preferred angle.

Referring first to FIGS. 1 and 2, there is shown a single-leg support 20 in accordance with an embodiment of the present invention. The support 20 typically includes a seat member 22 releasably mounted on a post member 24 while being typically axially adjustable relative thereto. The post member 24 is releasably mountable on a base member 26 interfacing with the ground surface G such that it can be mounted on different base members 26 if needed.

As shown more specifically in FIG. 1, the single-leg support 20 is essentially a kit that can easily be carried either using a handle 28 secured to the seat member 22 at any convenient location thereof such as below the comfort coil springs 29 or, as seen in FIG. 2, using a properly sized carrying bag 30 releasably attached to the seat member 22 to allow the user U to keep his/her hands free while using the support 20. Typically, the seat member 22 and post member 24 will be disconnected/detached from one another when carried in bag 30. Although not illustrated, a strap removably connected to the support could also be considered for carrying purposes. Also, the handle 28 could be combined with a mechanism (not shown) for pivoting the handle 28 to allow to carry the seat member 22 or the whole support 20 as a briefcase or the like.

The seat member 22 typically includes a comfortable seat or saddle 32 secured to a seat post 34, typically via a seat attachment using a well known screw-bolt arrangement or the like that allows angular adjustment or tilt (the roll and more specifically the pitch) and rotation (the yaw) of the saddle 32 relative to the seat post 34 using special tools, keys or the like, although a generally perpendicular orientation of the seat plane relative to the seat post axis 36 is preferred. The seat post 34 and the post member 24 typically slidably connect to one another in a telescopic arrangement for axial adjustment between the two along the axis 36 of the support 20 to adjust the overall length thereof. The seat member 22 is maintained in the desired position relative to the post member 24 using a quick release clamp 38 (as the type commonly mounted onto a bicycle frame to releasably secure the bicycle seat post thereto) or the like.

In a typical use as illustrated in FIG. 1, the support axis 36 is between about five and twenty-five degrees (5°-25°), preferably about fifteen degrees (15°), relative to the vertical, as shown by angle A in FIG. 1, such that the user U remains in equilibrium with most of his/her weight supported by his two legs at about five degrees (5°) from the vertical, as shown by angle B in FIG. 1, with the knees slightly bent (typically also about five degrees (5°)). Thus, the support 20 carries only a small portion of the user's weight for increased comfort.

The post member 24 of FIG. 1 is typically long relative to the seat post 34 and the lower end of the post member 24 is connected to the base member 26 that includes only a base cap 40 typically made out of sliding free material such as rubber, plastic material or the like.

In FIG. 2, the embodiment 20 is composed of parts 22, 24, 26 of substantially the same overall length to ease packing of the support 20, for example by insertion of parts 22, 24, 26 when detached/disconnected from one another into bag 30, for carrying purposes. Accordingly, the post member 24 is made shorter while the base member 26 includes a base post 42 releasably connected/attached to the lower end of the post member typically using a releasable quick attachment mechanism 44 such as a resilient metallic band with locking pin, locking button 45 shown in FIGS. 5 and 6, or the like for post 24, 34, 42 adapted to engage with a corresponding radial through hole 46. For example, as shown in FIG. 2, the releasable quick attachment mechanism 44 could include a resilient metal band on the post member 24 adapted for axial insertion of the base post 42 thereinto for engagement of locking pin or button in through hole 46 to releasably connect of the posts 24, 42 together. The attachment mechanism 44 could, further, be a removable resilient metal band. For example, and as shown in FIG. 2b, the attachment mechanism 44 could be a resilient metal band having open extremities into which both post member 24 and base post 42 are axially inserted for engagement of locking pins for post member 24 and base post 42 in through holes 16. The lower end of the base post 42 is typically covered with the base cap 40.

Depending on the intended use of the support 20, the base cap 40 could be either interchangeable or complemented with other types or shapes of base caps, such as a wider footprint or suction cup base 40a having a suction cup for providing suction with the ground surface and/or an anchor pin base 40b having an anchor pin for insertion into the ground surface, as shown in FIG. 2a. Such bases 40a, 40b are particularly useful for providing additional grip and stability for the support 20 when the base member 40, 40a, 40b rests on moving or muddy ground surface G such as found in nature when hunting for example. For hunting use, a camouflaging material 120, as shown in FIG. 3a, could also be placed on the support 20.

Figure 3:
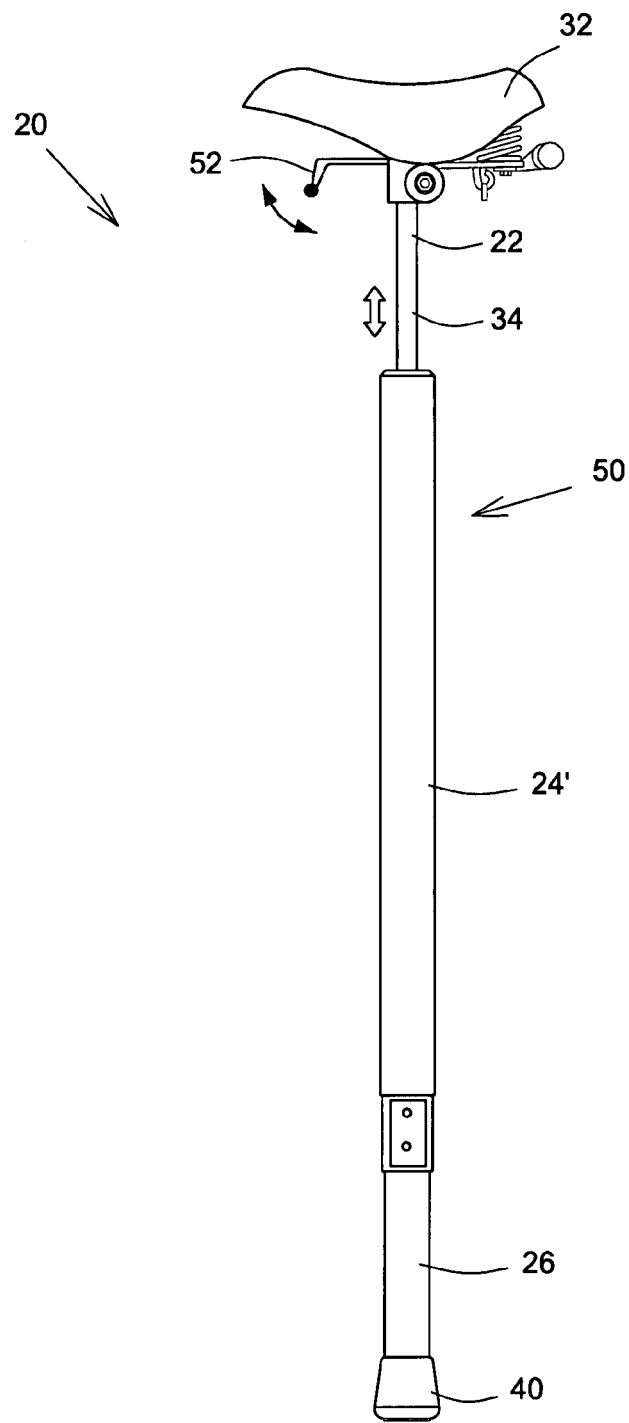
FIG. 3 is a view similar to FIG. 2, showing another embodiment of the present invention.
Figure 3A:
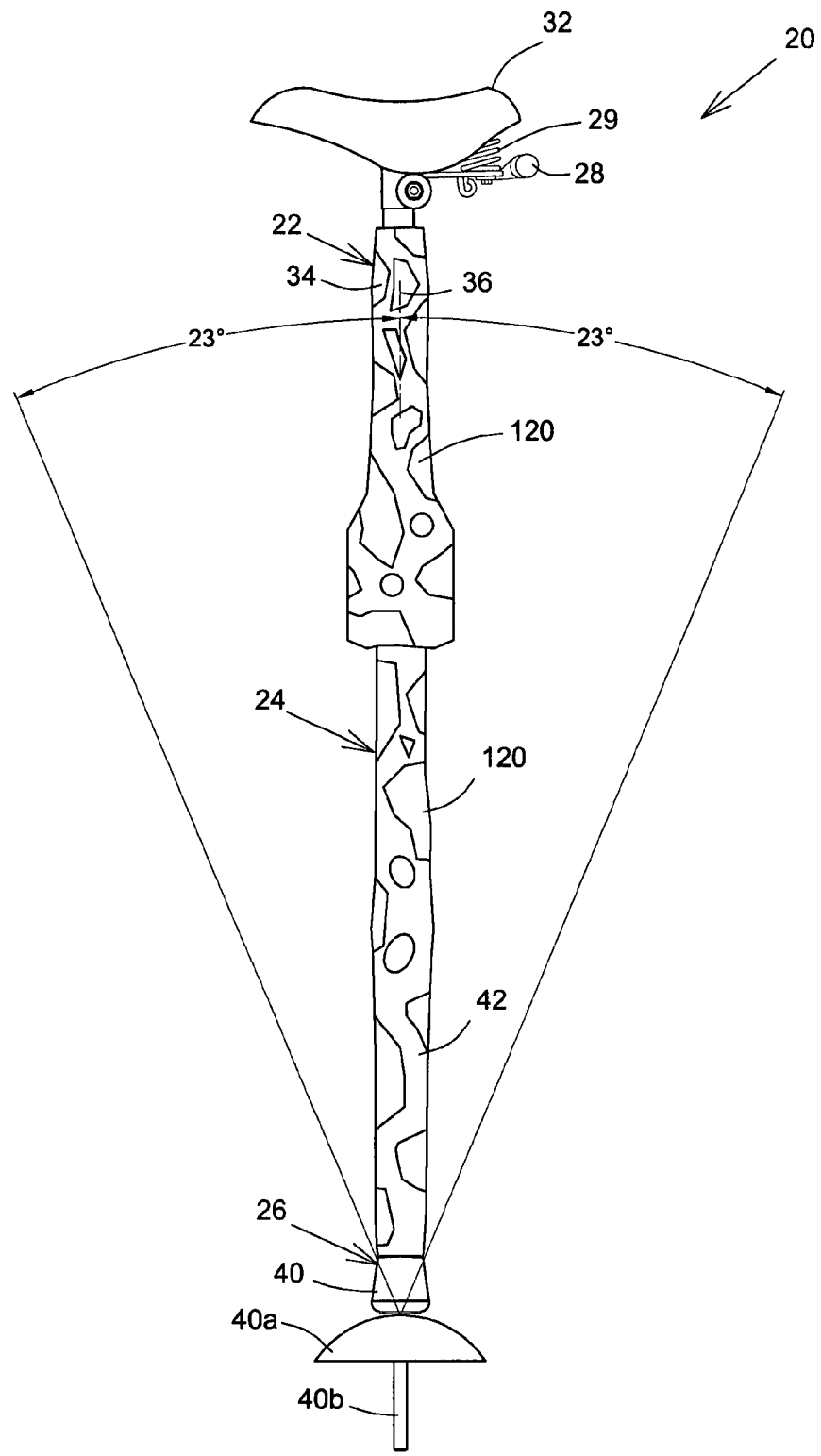
FIG. 3a is a is a view showing the embodiments of FIG. 2 having a camouflaging material placed thereon.

FIG. 3 shows another embodiment 20 of the present invention in which the seat post 34' forms the piston shaft of a well known gas piston cylinder 50 having its housing formed by the post member 24', and used as chair height adjustment and suspension mechanism in some office chairs and the like. The height adjustment of the seat 32 is dependent on the amount of gas (air) inside the spring loaded gas cylinder 50 (biased in the extended configuration by a compression spring, not shown) via an air inlet/outlet pressure valve (not shown) controlled by a valve control handle 52 typically mounted just under the seat 32. Specifically, the height of the seat is increased by increasing the amount of gas in the cylinder and decreased by decreasing the amount of gas in the cylinder using the valve. The gas cylinder 50 allows telescopic adjustment of the height of the seat 32, as well as providing a suspension/cushion within the support 20.

Eventually, the seat portion 22 of the support 20 could be coming from an existing bicycle or the like, in which case, the user would only need to carry the post member 24 and the base member 26 (optionally sold together as a bicycle kit or the like) on the side in a bag 30 or the like; the seat member 22 being part of the user's bicycle. In such a case, if required, a sleeve adaptor (not shown) could be provided to account for non-standard seat post diameter.

Figure 4A:
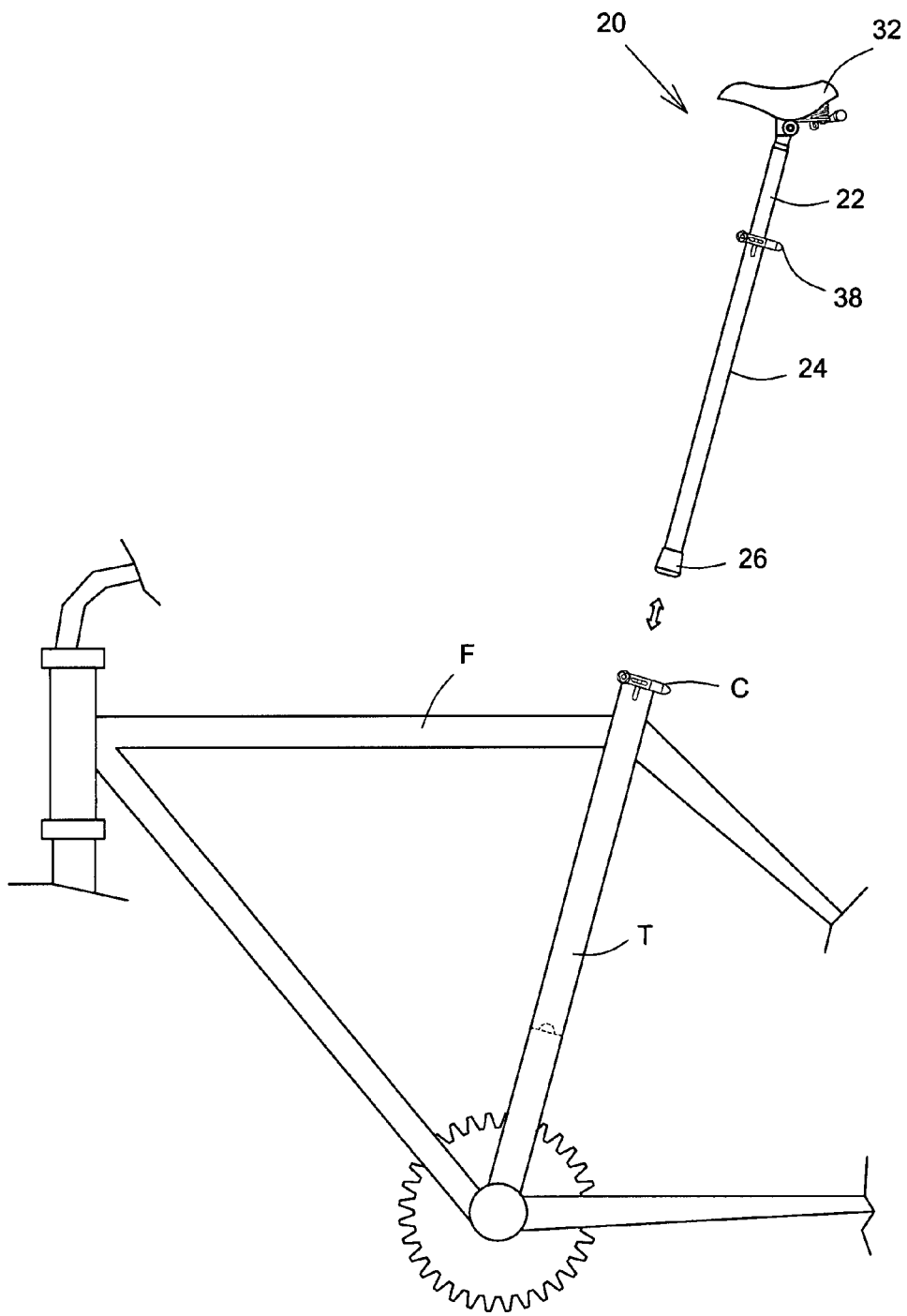
FIGS. 4a and 4b are simplified side elevation views showing the embodiment of FIG. 1 releasably connecting to two different bicycle frames.
Figure 4B:
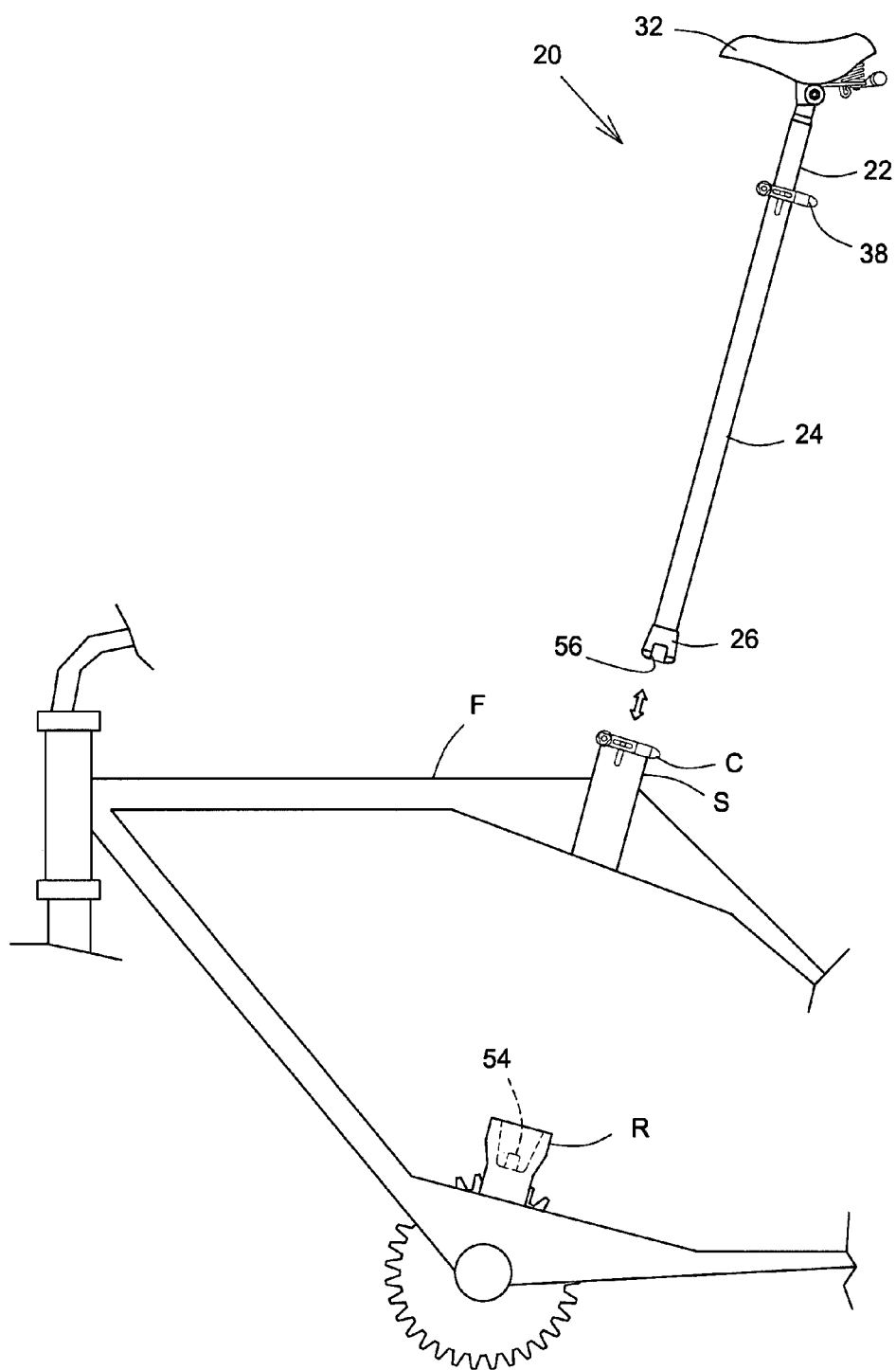

Alternatively, as shown in FIGS. 4a and 4b, the whole support 20 can be integral with the bicycle frame F with the post member 24 and the base member being either axially insertable into a seat tube T of the frame F and secured in place with a quick release clamp C of the frame F (see FIG. 4a), or the removable seat tube of the frame F that is axially insertable through a corresponding sleeve S located adjacent the seat 32 (when the support is in place on the bicycle) and secured in place with a quick release clamp C of the frame F, and with the base member 26 engaging a base receptacle R in register with the sleeve S and releasably locking in place using a locking key 54 adapted to engage a corresponding key slot 56 in the cup base 40 or the like base locking means (see FIG. 4b) to prevent the support 20 from rotating about its axis 36 when in place on the frame F. Obviously, although not shown safety locking means, integral with or separate from the quick release clamp C and/or the locking pin, could be considered to safely lock the support 20 onto the bicycle frame F such that it cannot be easily stolen by a thief or the like.

Reference is now made to FIGS. 5, 5a, 6, and 6a. For more specific uses of the support 20 at predetermined locations such as behind the usually high counters in banks or any other commercial offices where employees continuously interface with the public (as a grocery cashier) while standing up (or in replacement of high chairs), the base member 26' is usually heavier and is either permanently anchored to the floor surface via bolts 60 or the like (shown in dotted lines in FIG. 5) extending through bolt holes 61 or temporarily secured thereon using suction cups 62 or the like (see FIGS. 5, 5a and 6).

Figure 5:
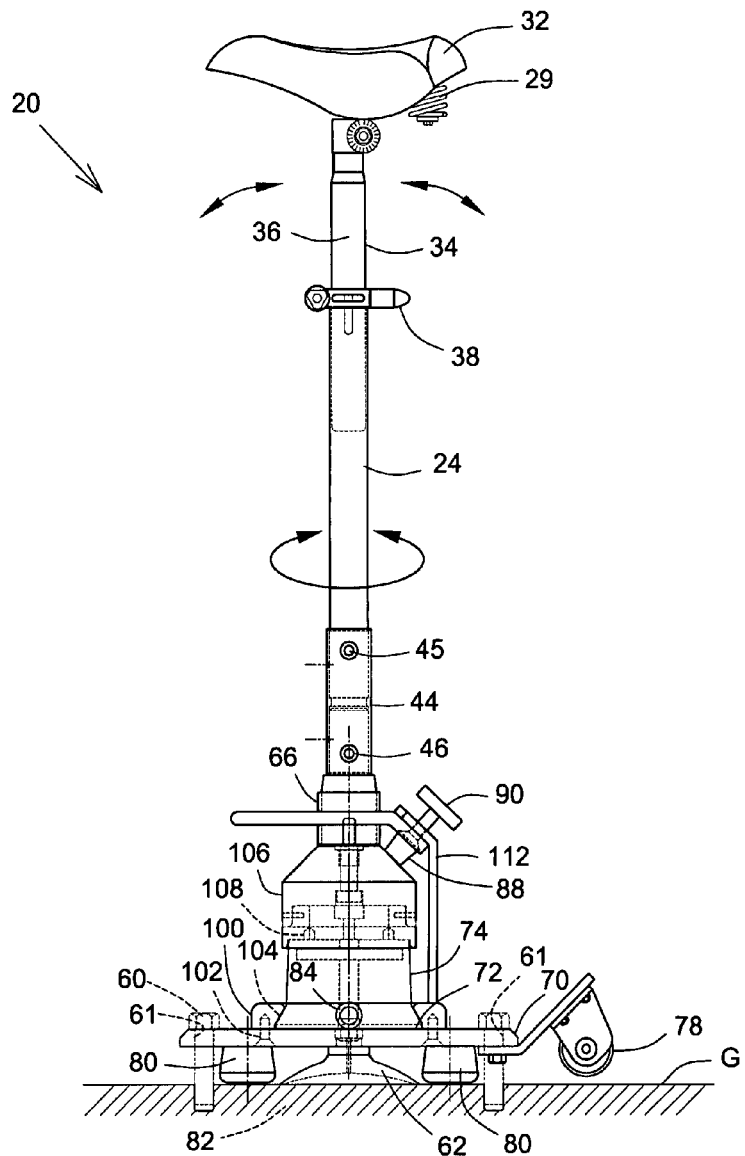
FIG. 5 is a simplified side elevation view of the embodiment of FIG. 2 with a heavy base member.
Figure 5A:
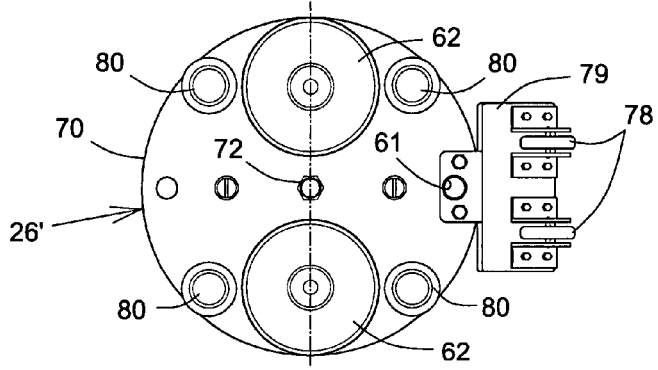
FIG. 5a is a simplified bottom plan view of the embodiment of FIG. 5.

Furthermore, to allow the user to bend in any direction (forward or on the sides), the base member 26' includes a flexible suspension and damper joint, shown generally as 64, releasably connecting to the post member 24 at the longitudinal top end 66 thereof via a releasable quick attachment mechanism 44 or the like. The flexible joint 64 allows a 360-degree rotation of the post member 24 relative to the flexible joint 64 about the support axis 36 and is secured to a base plate 70 at the other longitudinal bottom end 72. More specifically, the flexible joint 64 is connected to the base plate 70 by a plate collar 100, preferably of metal or other resistant material, connected by screws 102 to base plate 70. The plate collar 100 is preferably adapted to extend around and over flange 104 of longitudinal end 72 in mating abutting contact therewith when the plate collar 100 is connected by screws to the base plate 70, thereby securely connecting the joint 64, at longitudinal end 70 thereof, to the base plate 70. In the embodiment of FIG. 5, the flexible joint 64 includes a solid rubber block 74 which, additionally, is adapted to always bias the support 20, and notably member 24 and posts 24, 42 thereof, in an upright default configuration in which the post member 24 is disposed substantially perpendicularly the base plate 70. The rubber block 74 is connected to top portion 106 of the joint 74, having the top end 66. Connector protrusions 108, adapted for secure and retaining engagement in top portion 106 by insertion thereinto, facilitate connection of top portion 106 to rubber block 74 and retention of the connection therebetween. In the embodiment illustrated in FIG. 6, the flexible suspension and damper joint 64 includes, instead of sold rubber block 74, a pneumatic rubber balloon 86 (which internal pressure could be controlled via an accessible, valve not shown) which also biases the support 20 in its upright standby configuration. The balloon 68 is housed in balloon housing 110, which is connected to base plate 70 and to top portion 106 in the same manner as rubber block 74.

Carrying castors or wheels 78, preferably a pair thereof (for stability purpose), are optionally mounted side-by-side (in parallel configuration) on a wheel support plate 79 itself mounted on and adjacent the plate 70 for selective displacement of the support 20, in an angled orientation, whenever required. Typically, the plate 70 is supported on the floor surface via support feet 80 extending downwardly therefrom. When suction cups 62 are used to secure the support 20 to the floor surface, corresponding easily accessible vacuum relief valves 82 are typically provided to help releasing the support 20 from the floor surface G, the user simply needs to pull on the valve ring knobs 84. When the support 20 is secured onto the floor surface, the optional wheels 78 are typically spaced from the floor surface, as shown in FIGS. 5 and 6.

Also shown in FIGS. 5 and 6 is abutment member 88, mounted in connector member 112 which is connected to plate 70, preferably plate collar 100, and which extends upwardly therefrom in proximity to top portion 106, thereby connecting the abutment member 88 to plate 70. The abutment member 88 is adapted, i.e. sized, shaped, and positioned, to abut top portion 106 when in the standby position to prevent backward tilting of the seat and post members 22, 24 therebeyond, thereby preventing possible injuries to the user because of possible inadvertent rearward movements. The abutment member 88 includes an adjustable bolt screw 90, with which the abutment member 88 is mounted in connector member 112, which allows a forward adjustment of the standby configuration by preventing the post member 24 to fully come back in the upright position. To further limit motion of member 24 posts 34, 42, circular safety collar 116 is connected to connector member 112 and extends around post member 24, thus limiting the range of motion, i.e. tilting and rotation, of member 24 and/or the base post 42 to the inner perimeter of the safety collar 116.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A single-leg support for supporting a user in a generally standing position on a ground surface, said single-leg support comprising:
   a seat member comprising a seat post and a saddle upon which the user rests for support in said standing position;
   a post member for releasably and axially adjustably receiving the seat post of the seat member;
   a base member comprising a base post and a base cap connected thereto and adapted for resting of the base cap on the ground surface with the base post supporting said post member, and thereby said seat member and said user, thereabove when said user is supported on said seat member in said standing position; and
   an attachment mechanism comprising a resilient metal band attached to the post member and adapted for axial insertion of the base post thereinto, said resilient metal band having a first through hole for releasable engagement therein of a first locking pin on said base post for releasably attaching said base member to said post member.

2. The support of claim 1, wherein said base member comprises an anchor pin base insertable into the ground surface when said base member rests thereupon.

3. The support of claim 1, wherein said seat member is telescopically adjustably connected to said post member for telescopic adjustment of said seat member along a first axis defined by said seat post and said post member for adjusting a height of said seat member to support said user in said standing position.

4. The support of claim 3, wherein said seat post is adapted for sliding connection within said post member for telescopic sliding relative thereto to provide said telescopic adjustment, said seat post being releasably retained in place relative said post member by a releasable clamp disposed on said post member.

5. The support of claim 3, wherein said post member comprises a gas piston cylinder containing a gas in which said seat post is housed, said seat post forming a piston shaft for said gas piston cylinder, said height of said seat member being telescopically adjustable by increasing an amount of gas in said cylinder to increase said height and by decreasing said amount to decrease said height.

6. The support of claim 1, wherein said support is adapted for insertion into a bag for carriage of said support therein.

7. The support of claim 6, wherein said seat member and said post member are adapted for insertion into said bag by detaching said seat member from said post member and inserting said seat member and said post member into said bag.

8. The support of claim 1, wherein said seat member comprises a handle for carrying said support.

9. The support of claim 1, wherein said base member comprises a base cap releasably attached to said post member, said base cap being adapted for resting on the ground surface and made of a sliding free material for allowing detachment of said base member from said post member.

10. The support of claim 1, wherein said base member comprises a removable suction cup base for providing suction between said base member and the ground surface when said base member rests thereupon.

11. The support of claim 1, wherein said base member, said post member, and said seat member are substantially equal in length.

12. The support of claim 1, wherein said support is adapted for inserting of said base member and said post member through a sleeve of a bicycle frame with said base member engaged locked in a base receptacle of said bicycle frame in register with said sleeve for providing a seat for said bicycle, said base member being releasably lockable in place in said base receptacle by a locking means for said base receptacle and said post member being releasably attached to said sleeve with a clamp situated on said sleeve.

13. The support of claim 1, said support is adapted for axial inserting of said post member and said base member into a seat tube of a bicycle frame and for releasable attachment therein with a clamp situated on said seat tube and with said seat member extending out of said seat tube and thereby providing a seat for said bicycle.

14. The support of claim 1, wherein said resilient metal band has open extremities adapted for axial insertion of said post member and said base post therein and a second through hole for engagement of a second locking pin for said post member therein, said resilient metal band being thereby releasably attachable to both said post member and said base member.

15. A single-leg support for supporting a user in a generally standing position on a ground surface, said single-leg support comprising:

a seat member upon which the user rests for support in said standing position;

a post member for releasably and axially adjustably receiving the seat member; and a base member releasably attached to said post member, said base member being adapted for resting on the ground surface and supporting said post member, and thereby said seat member and said user, thereabove when said user is supported on said seat member in said standing position, said base member comprising a base plate, releasably attachable to said ground surface, and a tiltable flexible joint mounted on said base plate and to which said post member is releasably attached, said flexible joint being disposed between said base plate and said post member and providing tilting and rotatable movement of said post member relative said base plate.

16. The support of claim 15, wherein said flexible joint is adapted to resiliently bias said post member, and thereby said support, into an upright configuration in which said post member is disposed substantially perpendicular relative to said base plate.

17. The support of claim 16, wherein said joint comprises a resilient solid rubber block disposed between said base plate and said post member.

18. The support of claim 16, wherein said joint comprises a resilient pneumatic rubber balloon and a balloon housing in which said rubber balloon is housed, said balloon and said rubber housing being disposed between said base plate and said post member.

19. The support of claim 16, wherein said base plate comprises a plate collar and said flexible joint comprises a flange extending therearound, said plate collar being attached to said base plate with screws and extending around and over said flange in mating abutment therewith for retaining said flange, and thereby said joint, in abutting contact with said base plate to attach said joint to said base plate.

20. The support of claim 19, wherein said joint has connector protrusions, situated generally opposite said flange, extending therefrom and adapted for secure and retaining insertion into a top portion of said joint to which said post member is attached.

21. The support of claim 16, wherein said base member further comprises an abutment member adjustably mounted on said base plate in proximity to a top portion of said joint to which said post member is attached, said abutment member being adapted to abut said top portion when said support is in said upright configuration to prevent backward tilting of said post member beyond said upright configuration.

22. The support of claim 21, wherein said abutment member is mounted on said base plate by a connector member attached to said base plate and extending upwardly therefrom, said abutment member being mounted in said connector member in proximity to said top portion.

23. The support of claim 22 wherein said abutment member is mounted in said connector member with an adjustable blot screw, said abutment member being adjustable relative said top portion by turning of said blot screw to adjust said upright configuration.

24. The support of claim 16, wherein said base member further comprises a circular safety collar mounted on said base plate and extending around said post member, said safety collar limiting tilting and rotation of said post member relative said base plate to an inner perimeter of said safety collar.

* * * * *